(12) United States Patent
    Geier

(10) Patent No.: US 12,591,305 B2
(45) Date of Patent: Mar. 31, 2026

(54) INTELLIGENT HUMAN-MACHINE INTERFACE AND METHOD WHICH CAN BE CARRIED OUT USING SAME

(71) Applicant: PALEKANA VERWALTUNGS UG (HAFTUNGSBESCHRäNKT), Süderholz (DE)

(72) Inventor: Andreas Geier, Tokyo (JP)

(73) Assignee: PALEKANA VERWALTUNGS UG (HAFTUNGSBESCHRÄNKT), Süderhotz (DE)

( * ) Notice: Subject to any disclaimer, the term of this patent is extended or adjusted under 35 U.S.C. 154(b) by 415 days.

(21) Appl. No.: 18/038,632

(22) PCT Filed: Nov. 27, 2020

(86) PCT No.: PCT/EP2020/083763
§ 371 (c)(1),
(2) Date: May 24, 2023

(87) PCT Pub. No.: WO2021/079011
PCT Pub. Date: Apr. 29, 2021

(65) Prior Publication Data
US 2024/0004469 A1    Jan. 4, 2024

(51) Int. Cl.
  *G06F 3/01*     (2006.01)
  *G01B 7/24*     (2006.01)
  *G06F 3/0346*   (2013.01)

(52) U.S. Cl.
  CPC ............... *G06F 3/015* (2013.01); *G01B 7/24* (2013.01); *G06F 3/0346* (2013.01)

(58) Field of Classification Search
None
See application file for complete search history.

(56) References Cited

U.S. PATENT DOCUMENTS

2010/0179440 A1 *   7/2010   Lee ..................... A61B 5/02444
                               600/500
2018/0067552 A1    3/2018   Chen et al.
            (Continued)

FOREIGN PATENT DOCUMENTS

CN       102349037 A    2/2012
TW      201918828 A    5/2019

OTHER PUBLICATIONS

PCT International Search Report and Written Opinion completed by the ISA/EP on Jul. 30, 2021 and issued in connection with PCT/EP2020/083763.

(Continued)

*Primary Examiner* — Aurelie H Tu
(74) *Attorney, Agent, or Firm* — Barnes & Thornburg LLP

(57) ABSTRACT

A human-machine interface is configured for application to a skin area of an extremity, and may include a flexible layer to contact a surface of the skin area and includes magnetic or magnetizable elements, magnetic fields of which form a magnetic signature changing in response to deformation of the surface of the skin area, a detection device for measuring the magnetic signature, potential-measuring surface electrodes arranged in or on the flexible layer to directly contact the surface of the skin area, wherein measurement signals generated by the electrodes form an electric signature changing in dependence on muscle activity causing deformation of the surface of the skin area, and an integrated or external processing unit configured to map a magnetic signature and an associated electric signature to at least one of a configuration of the extremity, a temporal change in the configuration and a force of the temporal change.

19 Claims, 4 Drawing Sheets

(56)           References Cited

U.S. PATENT DOCUMENTS

| 2018/0081439 | A1  |  3/2018 | Daniels |
|---|---|---|---|
| 2018/0307314 | A1  | 10/2018 | Connor |
| 2022/0236789 | A1* |  7/2022 | Geier ...................... G06F 1/163 |

OTHER PUBLICATIONS

Almanouri, et al., "An Imperceptible Magnetic Skin", Advanced Materials Technologies, Band 4, Nr. 10, Oct. 10, 2019 (Oct. 10, 2019), Seite 1900493-1, XP055688067.
Gilbert Santiago Canon Bermúdez et al, "Magnetosensitive e-skins with directional perception for augmented reality", United States, Jan. 1, 2018 (Jan. 1, 2018).
Office Action for copending TW patent application No. 110124744, dated Nov. 19, 2024.

\* cited by examiner

INTELLIGENT HUMAN-MACHINE INTERFACE AND METHOD WHICH CAN BE CARRIED OUT USING SAME

CROSS-REFERENCE TO RELATED APPLICATION

This is a national stage entry of International Patent Application No. PCT/EP2020/083763, filed Nov. 27, 2020, the disclosure of which is incorporated herein by reference in its entirety.

FIELD OF THE INVENTION

The described invention relates to a novel non-invasive human-machine interface and to a method which can be carried out with such an intelligent non-invasive human-machine interface.

SUMMARY

The increasing interconnectedness and digitalization of today's world demands intuitive communication between a human being (or also an animal) and electronic devices of all kinds. A catchword which may be mentioned here is the internet of things (IoT), which is understood as meaning the connection to a large number of devices via the internet and whereby it is at the same time possible for users to operate or control these devices.

Without making any claim to completeness, examples of such devices which may be mentioned include: vehicles of all kinds, domestic appliances, heating systems for buildings, fitness trainers, gaming devices, drones, medical prostheses, robots and many others.

In order to operate and/or control these and other devices, intelligent human-machine interfaces are required, which allow a human being (or animal) to use the devices in a manner that is as simple and intuitive as possible.

The object of the present invention is to provide a preferably wearable, non-invasive human-machine interface.

In order to achieve the mentioned object there is proposed a preferably wearable human-machine interface which is configured for non-invasive application to a skin area of a human or animal body and which comprises:

- a flexible, first magnetic layer which is configured to come into contact with a surface of the skin area and which includes or carries a first plurality of magnetic or magnetizable elements, the magnetic fields of which together form a magnetic signature at any point in time, wherein the flexibility of the layer is such that the layer is able to at least substantially follow deformations of the surface of the skin area, and wherein the magnetic signature changes in a measurable manner when the surface of the skin area deforms,
- a detection device for measuring the magnetic signature based on a deformation of the flexible, first magnetic layer, which detection device faces the side of the flexible layer that is remote from the skin area,
- a second plurality of potential-measuring surface electrodes which are arranged in or on the flexible layer so as to come into direct contact with the surface of the skin area, wherein the totality of the measurement signals generated at a specific point in time by the potential-measuring surface electrodes forms an electric signature which changes in dependence on muscle activity, and an integrated or external processing unit which is adapted to assign in each case a pair consisting of a magnetic signature and an associated electric signature to a configuration and/or movement and/or intensity thereof. It is an important characteristic of the human-machine interface according to the invention that its components and the functions thereof are located, or take place, wholly outside the human or animal body.

Within the scope of this disclosure, the expression "magnetic or magnetizable element" is understood as meaning any elements which either are themselves magnetic or can be magnetized, for example permanent magnets or magnetizable particles, which may also be arranged, for example, in a magnetic band or a magnetic strip. In particular, a magnetic or magnetizable element is also understood as being a current-carrying conductor, such as, for example, an electromagnet. It is important that any magnetic or magnetizable element results in magnetization that is externally effective and can be detected by the detection device.

The flexibility of the first magnetic layer must be such that the first magnetic layer is able at least substantially to follow deformations of the surface of the skin area. This can be achieved, for example, by an intrinsic flexibility of the first magnetic layer or by movable coupling of individual elements that in themselves are rigid.

In an advantageous embodiment of the human-machine interface according to the invention, the flexible, first magnetic layer includes a plurality of magnets which are arranged in the form of an array. Such a flexible magnetic layer can be produced, for example, by embedding commercially available permanent magnets with a simple north-south pole configuration into a band-like, resilient silicone layer. Alternatively, or in addition, current-carrying conductors, for example electromagnets in the form of an array, or combined sensor elements (see the explanation hereof hereinbelow) can be set into a band-like, resilient silicone layer. Other arrangements are of course conceivable and likewise suitable.

The flexible, first magnetic layer of the human-machine interface according to the invention is further distinguished in that a second plurality of potential-measuring surface electrodes are embedded into the flexible layer or applied thereto such that these potential-measuring surface electrodes come into direct contact with the surface of the skin area during operation of the human-machine interface. The first plurality and the second plurality can be equal in terms of numbers, but this is not a prerequisite for the functioning of the human-machine interface according to the invention. The potential-measuring surface electrodes can in particular be electromyography (EMG) electrodes, as are used within the context of electromyography (EMG). Other flat electrode forms are likewise conceivable. The electric potentials derived by means of the potential-measuring surface electrodes on the surface of the skin area are in particular electromyographic potentials, which provide information about the electrical activity of those muscles that are involved in a given skin deformation.

In a preferred embodiment in which the flexible, first magnetic layer includes a plurality of magnets arranged in the form of an array, the number of magnets corresponds to the number of potential-measuring surface electrodes and each potential-measuring surface electrode is rigidly coupled with a magnet, for example by application of the potential-measuring surface electrode to the surface of the magnet that faces the skin area.

A combination of a potential-measuring surface electrode and a magnetic or magnetizable element rigidly or at least fixedly coupled therewith is referred to as a "combined sensor element" within the scope of this disclosure. The totality of such combined sensor elements is accordingly capable not only of measuring a magnetic signature, which is composed of the magnetic fields of all the magnetic or magnetizable elements, but also of providing an electric signature, which is composed of the totality of the measurement signals generated at a specific point in time by the potential-measuring surface electrodes, which can be measured in the case of a deformation of the surface of the skin area by deriving muscle activity by means of the potential-measuring surface electrodes. The magnetic signature resulting from measurements of the magnetic properties and the electric signature obtained from measurements of the electromyographic potentials can together be referred to as a combined signature, which characterizes a displacement/twisting, resulting from a muscle-induced skin deformation, of one or more magnetic or magnetizable elements in conjunction with the associated skin-conforming potential-measuring surface electrodes.

According to the invention, the magnetic signature is measured using a suitably configured detection device which faces the side of the flexible, first magnetic layer that is remote from the skin area. In other words, the detection device is configured to detect at least those changes of the magnetic signatures of the magnetic layers that are caused by a deformation, relative to an initial state, of the surface of the skin area and in particular by a muscle-induced deformation of the skin area.

In preferred embodiments, this detection device contains multiple magnetometers, which are preferably arranged in the form of an array. The form of this array does not have to match the array in which the first plurality of magnetic or magnetizable elements is arranged. Nor does the number of magnetometers need to match the number of magnetic or magnetizable elements contained in the flexible, first magnetic layer.

When the combined sensor elements discussed above are used in the human-machine interface according to the invention, each potential-measuring surface electrode and the magnetic or magnetizable element(s) fixedly coupled therewith is preferably separated from one another by an electromagnetic insulating layer in order to protect against magnetic interference fields. Such an electromagnetic insulating layer can be a layer of a material with high magnetic permeability, such as, for example, iron, μ-metal, carbon fibres, etc.

The human-machine interface according to the invention may optionally comprise a second magnetic layer including a plurality of magnetic or magnetizable elements. This second magnetic layer may be arranged between the flexible, first magnetic layer and the detection device or may be located on the side of the detection device that is remote from the flexible, first magnetic layer. The second magnetic layer does not need to be flexible but, in order to facilitate non-invasive application and to improve skin conformity, can have the same or similar flexibility to the flexible, first magnetic layer. The second magnetic layer interacts with the first magnetic layer through its magnetic field.

The magnetic properties of the first and the second magnetic layer are preferably such that the polarity/magnetic charges of the two magnetic layers is/are opposite. According to one embodiment, the flexible, first magnetic layer can contain magnets or magnetic particles or have material properties such that it is magnetizable in a desired direction from outside, for example by current-carrying conductors or permanent magnets of the second magnetic layer.

The resulting magnetic fields formed by the first magnetic layer or by the first and second magnetic layer are measured by the detection device, preferably by one or more magnetometers arranged in an array, as a magnetic signature. In particular the second magnetic layer can contain current-carrying conductors which are suitable for measuring, controlling and/or compensating for the strength of magnetic fields. Furthermore, the second magnetic layer can preferably have a magnetic field strength and polarity which effects a repulsion of the magnetic or magnetizable elements and/or combined sensor elements used in the flexible, first magnetic layer in the direction of the surface of the skin area. In this manner, the conformity of the flexible, first magnetic layer to the surface of the skin area is increased even in the case of rapid deformations of the skin area. Moreover, hysteresis phenomena, which result from the flexibility of the flexible layer, are reduced. In addition, undesirable, premature saturation of the magnetometers can be counteracted in this way. Such a desired influencing of the first magnetic layer by the second magnetic layer that is optionally present can be subtracted out of the measured magnetic signature, for example in the manner of an (also temporally changeable) offset, in order to compensate for any falsification of the measured magnetic signature resulting from the desired influencing.

If the magnetic properties of at least one of the magnetic layers are brought about by electromagnets, the magnetic fields of the magnets, magnetized particles or combined sensor elements used can be controlled, resulting in further possibilities for compensating for and/or controlling the magnetic field strength or shape. Significant advantages in terms of the precision and speed of measurement of the deformation of the surface of the skin area in question can be achieved by controlling the magnetic properties in this way.

The provision of a second magnetic field and the advantages resulting therefrom as described hereinbefore can also take place independently of the presence of the second plurality of potential-measuring surface electrodes. In other words, an embodiment of the human-machine interface according to the invention that is likewise very advantageous has the second magnetic layer but not the second plurality of potential-measuring surface electrodes. In such an embodiment, the allocation to a configuration and/or movement and/or intensity thereof takes place solely on the basis of the detected magnetic signature.

If desired or, depending on the application, necessary, an additional electromagnetic insulating layer of a material with high magnetic permeability, such as, for example, iron, μ-metal, carbon fibres, can be provided on the side of the first magnetic layer that is remote from the skin area, which additional insulating layer serves inter alia to protect against magnetic interference fields. In embodiments with a first and a second magnetic layer, such an additional electromagnetic insulating layer is to be arranged on the side of the second magnetic layer that is remote from the skin area.

Within the scope of the present disclosure, "magnetic properties" are understood as meaning that the magnetic properties of the magnetic layers are such that a deformation of the surface of the skin area, which in particular the flexible, first magnetic layer follows, leads to a measurable change of the magnetic properties of at least one of the layers, preferably of the flexible, first magnetic layer.

Finally, the human-machine interface according to the invention comprises a processing unit which is adapted, by executing an algorithm, to map the measured magnetic and electric signatures to a configuration and/or movement and/ or intensity thereof. In particular, the processing unit can be configured to assign in each case a pair consisting of a magnetic signature and an associated electric signature to a configuration and/or movement and/or intensity thereof.

The processing unit belonging to the human-machine interface can be integrated or external. "Integrated" here means that the processing unit is located directly at the wearable human-machine interface. However, this processing unit can also be arranged remote from the wearable human-machine interface and communicate with the wearable human-machine interface, for example, via a wired and/or wireless connection.

The causes of the deformation of the surface of a skin area can be deliberate or involuntary. For example, a human being can deliberately move his extremities into a different position, which entails corresponding deformations of specific skin areas. On the other hand, involuntary deformations of specific skin areas can occur (for example as a result of involuntary muscle contractions or organ movements), for example as a result of a disease of the human being, the detection and mapping of which involuntary deformations can allow a doctor to make a better diagnosis.

Within the scope of the present invention, the term "configuration" is understood as meaning minimal coordinates which are necessary to describe the degrees of freedom of the extremity in question, in the case of a human hand, for example, the joint angle. In other words, a "configuration" is a specific position of a human or animal extremity (examples which may be mentioned here include: leg extended, leg bent, hand open, hand closed, arm straight, arm bent, hand twisted or not twisted relative to elbow, etc.). A configuration can of course also indicate a state between two end configurations, for example arm partly stretched, hand partly closed, etc.

Within the context of the present invention, the term "movement" is understood as meaning a temporal change (in particular in terms of extent and speed) of a configuration.

Within the scope of the present invention, the expression "intensity of the movement" is understood as meaning in particular the force with which a movement is performed.

Generally speaking, a deformation of the surface of skin areas occurs in a human or animal body as a result of deliberate or involuntary muscle, tendon, ligament, bone and/or organ movements. It is an object of the present invention to detect such deformations and reliably assign them to specific states (configurations) and/or movements and, if desired, intensity thereof.

The magnetic layers can have different configurations. It is important, however, that the flexible, first magnetic layer in particular has sufficient conformity with the surface of the skin area of interest, so that deformations of the skin surface that occur and the associated deformations of the flexible, first magnetic layer lead to measurable changes of its magnetic properties. Furthermore, skin conformity is a requirement for optimal measurement by the potential-measuring surface electrodes.

More specifically, in respect of both magnetic layers, changes of the magnetic field strength and/or changes of the magnetic flux density are preferably measured. In other words, the magnetic field that results in each case is measured, whereby a magnetic field that is present does not necessarily have to change but merely needs to present itself, from the point of view of the detection device, as a different magnetic field after a skin deformation.

It is advantageous in this context that the magnetic layers contain a pole configuration with many north-south pole pairs, or consist thereof. In this manner, a displacement or twisting of the magnetic layers permits a magnetization that is measurable from outside by measuring the magnetic field. The pole configuration with the strength of the respective magnetization is thereby important, so that changes of the magnetic flux density and/or magnetic field strength are measurable by means of magnetometers.

In addition to measuring the magnetic and electric signature, it can be advantageous to detect further information which arises during a deformation of the surface of a skin area of interest. For this reason, in preferred embodiments of human-machine interfaces according to the invention, one or more acceleration sensors and/or rotation rate sensors are further present, the output signals of which can likewise be provided to the processing unit.

Based on the detected magnetic and electric signatures of the magnetic layers which have occurred as a result of a deformation of the surface of a skin area of interest, the processing unit executes an allocation or assigning algorithm which maps the measured change (or the measured changes) of the magnetic and electric signature(s) to a configuration and/or a movement and/or intensity of the movement.

On the basis of the allocated configuration and/or movement and/or intensity thereof, the processing unit or a downstream control unit can generate, for example, a control command which is provided to a device, which subsequently performs an action corresponding to the control command. Accordingly, the action performed by the device corresponds to the at least one configuration and/or movement and/or intensity thereof allocated by the processing unit, or the allocation algorithm. The allocated configuration and/or movement and/or intensity thereof can be, for example, a gesture or continuous movement of individual or multiple fingers.

The mapping of the change in the magnetic properties of the magnetic layers detected by the detection device, for example by means of magnetometer measurements, to, for example, a configuration of a human extremity can advantageously be achieved with the assistance of artificial intelligence. The processing unit of a human-machine interface according to the invention is therefore preferably adapted to assign the measured change of the magnetic signatures of the magnetic layer or layers to a configuration and/or movement and/or intensity thereof with the assistance of Bayes classifiers, an artificial neural network (for example convolutional long short-term memory networks or graph neural networks), a support vector machine, a finite state machine, a hidden Markov model, a relevance vector machine, a dynamic time warping method, a conditional random field method, a decision tree, a random forest method, k-nearest neighbors algorithm, a discriminant analysis, a linear regression, a logistic regression, a Gaussian process, a perceptron and/or ensemble methods (Bayes optimal classifier, bagging, boosting), with the additional inclusion of the data obtained from the potential-measuring surface electrodes, and optionally with the inclusion of the data supplied by rotation rate and/or acceleration sensors. Generally speaking, datasets consisting of specific magnetic and electric signatures and an associated, arbitrary configuration and/or movement are first recorded, and then the relationship between these values is determined in a so-called training process. A distinction is to be made between a learning or training mode, in which sufficient measurement data must be detected and assigned in order subsequently, in a prediction mode, to permit a correct mapping of a single measurement or multiple measurements of the human-machine interface to a configuration and/or movement and/or intensity thereof. Since the measured changes of the magnetic properties are attributable, in addition to tendon, bone or organ movements, substantially to the skin deformation caused by muscle activation and finally muscle contraction, these muscle activations, or measurable electrode potential changes associated therewith, are detected according to the invention by the potential-measuring surface electrodes and are used to further improve the recognition of configurations and/or movements and/or intensities thereof by the processing unit.

Advantageous embodiments of the human-machine interface according to the invention further comprise a communication unit for exchanging data with at least one external device which, based on the data exchanged with the human-machine interface, is able to perform an action which corresponds to the at least one assigned configuration and/or movement and/or intensity thereof.

For example, a human-machine interface according to the invention can be integrated into a smartwatch, so that functions of the smartwatch can be carried out with the assistance of the human-machine interface according to the invention. It would be conceivable, for example, that specific finger and/or hand movements are assigned to specific functions and/or control commands of a smartwatch, so that the smartwatch can be operated simply and intuitively by performing these movements. Another application could be the control of robots in the sense of telerobotics, wherein the degrees of freedom of the robot, or of its end effector, that are to be controlled are controlled with the involvement of the configuration and/or movement and/or intensity thereof identified by the processing unit.

The present invention is directed also to a method for detecting a deformation of the surface of a skin area of a human or animal body and assigning the detected deformation to a configuration and/or movement and/or intensity thereof. The method comprises the steps:

arranging a first plurality of magnetic or magnetizable elements on or close to a skin area, such that the first array is able to at least substantially follow a skin deformation, arranging a second plurality of potential-measuring surface electrodes such that the potential-measuring surface electrodes come into direct contact with the surface of the skin area, determining at least one measurable change, occurring as a result of a skin deformation, of a magnetic signature of the totality of the first plurality of magnetic or magnetizable elements by means of a detection device for measuring the magnetic signature, recording the measurement signals generated at a specific point in time by the totality of the second plurality of potential-measuring surface electrodes in order to obtain at least one electric signature that changes in dependence on muscle activity, and executing an algorithm for mapping the at least one magnetic signature that has been determined and the at least one electric signature that has been obtained to a configuration and/or movement and/or intensity thereof.

As already explained hereinbefore, the deformation of the surface of the skin area can be based on a deliberate or involuntary muscle, tendon, ligament, bone and/or organ movement, wherein muscle-induced movements accompany the activation of muscles and accordingly allow (electric) surface potentials to be detected. As already explained hereinbefore in connection with the human-machine interface according to the invention, the mapping algorithm is preferably a trained artificial intelligence which has determined or learned the relationship between magnetic signatures and electric signatures and associated configurations and/or movements and/or intensity thereof on the basis of a dataset consisting of at least one magnetic signature and at least one electric signature and the associated configuration and/or movement and/or intensity thereof. There can be used as the mapping algorithm preferably those algorithms that have already been mentioned above in connection with the human-machine interface.

The expression "magnetic signature" and "electric signature" is understood as meaning the totality of the changes in the magnetic and electric properties of the magnet and electrode arrays which are to be measured or which have been measured and which arise as a result of a deformation that has taken place of the surface of a skin area of interest or of the musculature underlying that skin area. A different magnetic/electric signature which describes an initial state before the occurrence of a skin deformation can thereby serve as reference.

In particular, a signal conditioning or initialization can be carried out on the basis of a predefined reference configuration before the start of detection of a change of the magnetic/electric signature. For example, for such a reference configuration, all measurement signals can be zeroed and changes of the magnetic/electric signature can be measured starting from this reference configuration. According to one exemplary embodiment, each magnetic signature is composed of measured magnetic field strengths and/or measured magnetic flux densities of a magnet array which uses combined sensor elements. The magnetic signatures are accordingly supplemented according to the invention by electric signatures, wherein the magnetic signature results from a deformation of the skin surface and the electric signature is obtained by electromyographic surface measurements of the muscles lying beneath the deformed skin area.

Accordingly, in the present invention, the measured changes, occurring within the context of a skin deformation, of the magnetic and electric properties of the magnetic layer(s) represent the signal to be used. Other changes, which can be caused, for example, by disturbance variables such as the earth's magnetic field or magnetic objects, must optionally be filtered out of the measured signals. If, for example, there are magnetic components in the human-machine interface, these can be permanently compensated for by means of a so-called hard-soft iron calibration, that is to say such a calibration has to be carried out only once for a given human-machine interface. The earth's magnetic field at a given site of use of the human-machine interface can also be compensated for permanently. In order to compensate for magnetic interference fields, additional magnetometers can be referenced and/or electromagnetic materials can be used for protection, for example highly permeable iron or μ-metals.

BRIEF DESCRIPTION OF THE DRAWINGS

Exemplary embodiments of a human-machine interface according to the invention and of the method according to the invention will be explained in greater detail hereinbelow with reference to the accompanying schematic drawings, in which.

DETAILED DESCRIPTION

Figure 1:
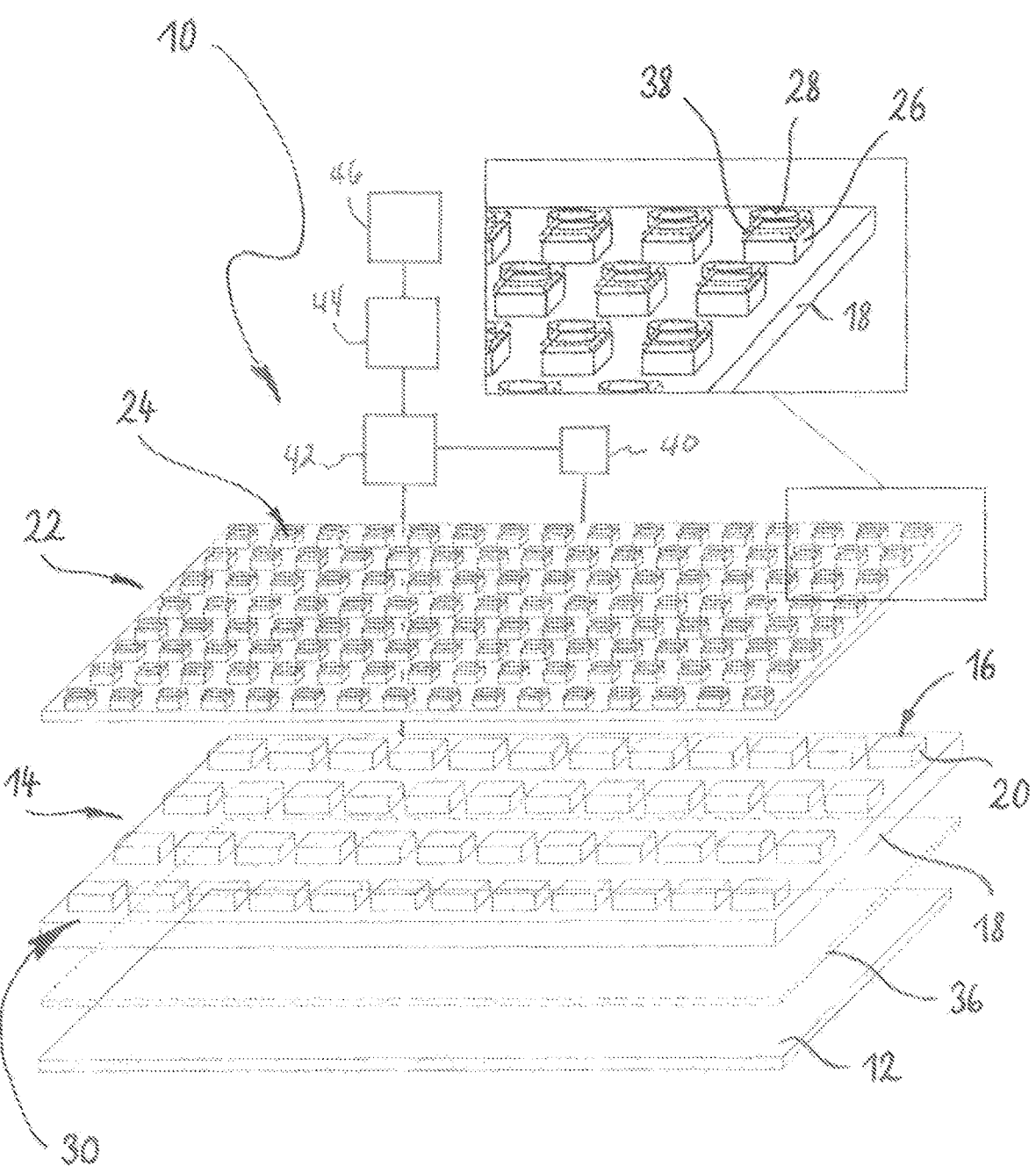
FIG. 1: is a schematic illustration of the structure of a first embodiment of a human-machine interface according to the invention.

FIG. 1 shows schematically, in an exploded illustration and in layers, the structure of a human-machine interface, designated generally 10, which was used to implement an exemplary embodiment, described in greater detail hereinbelow, of a method according to the invention. In the exemplary embodiment described here, the human-machine interface 10 has a generally band-like form and has a carrying element 12 in the form of a band, by means of which the human-machine interface 10 can be fastened, for example, to the wrist of a user facing a skin area (not shown). For this purpose, the carrying element 12 is preferably flexible, but in other embodiments, not shown, it may also be rigid.

On the carrying element 12 there is arranged a layer 14 which serves for the positioning of an array of magnetometers 16. In this exemplary embodiment, each magnetometer 16 contains combined Hall effect sensors and can thus measure the magnetic flux density in x-, y- and z-directions. Here, the magnetometer array is in the form of a printed circuit board 18 having 4×12 sensor chips 20, in which the magnetometers 16 are arranged. Each sensor chip 20 here contains, in addition to a magnetometer 16, also an acceleration sensor and a rotation rate sensor and thus permits 9-axis measurement, if desired.

In FIG. 1 there is located above the layer 14 a flexible, first magnetic layer 22 which consists of silicone rubber and here is likewise in the form of a band and in which there is embedded an 8×16 array of a total of 128 so-called combined sensor elements 24. The silicone rubber used in the exemplary embodiment described here is transparent.

Each combined sensor element 24 has a magnet 26, which here is in the form of a permanent magnet, and a potential-measuring surface electrode 28, which is located on the side of the magnet 26 that faces the skin area and is rigidly coupled with the magnet. In the example shown, the potential-measuring surface electrodes 28 are electromyography (EMG) electrodes for measuring electromyographic potentials.

The flexible layer 22 referred to as the first magnetic layer, with the combined sensor elements 24 embedded therein, lies, in conformity with the assumed exemplary embodiment, in a skin-conforming manner against the underside of the forearm close to the wrist of a user. Owing to the magnetic measurement principle, the magnetometers 16 and the combined sensor elements 24 do not need to be coupled by a physical medium, as is necessary, for example, in the case of force or pressure sensors. The flexible layer 22 of silicone rubber is highly resilient, in order to minimize hysteresis phenomena, but at the same time sufficiently flexible to be able to follow even small skin deformations.

The magnetometer array with the magnetometers 16 arranged thereon forms, together with multiplexers, not shown here, and a microcontroller, likewise not shown, a detection device 30 of the human-machine interface 10 according to the invention. There can be used as the microcontroller, for example, a microprocessor or a microcontroller already present in a smartwatch or other electronic device.

The EMG electrodes 28 are connected to electronic measuring equipment 40 which is known to experts in this field and therefore not explained or shown further.

The detected magnetometer measurements and electromyographic measurement signals are fed by the microcontroller to a processing unit 42, which, by means of an algorithm implemented therein, can perform a mapping of a measured magnetic and electric signature to a configuration and/or movement and/or intensity thereof. This processing unit 42 can, for example, be integrated into a smartwatch and would then be an integral part of the human-machine interface 10, but it may also be located remote from the human-machine interface and communicate, for example wirelessly, with the arrangement shown in the figures. Owing to the use of the combined sensor elements 24 already discussed hereinbefore, electric signatures (caused by muscle activity) can be measured and transmitted to the processing unit 42 in addition to the magnetic signature generated by the magnets 26. The human-machine interface 10 may further include a communication unit 44 for exchanging data with at least one external device 46 which, based on the data exchanged with the human-machine interface 10, is able to perform an action which corresponds to the at least one assigned configuration and/or movement and/or intensity thereof.

Figure 2:
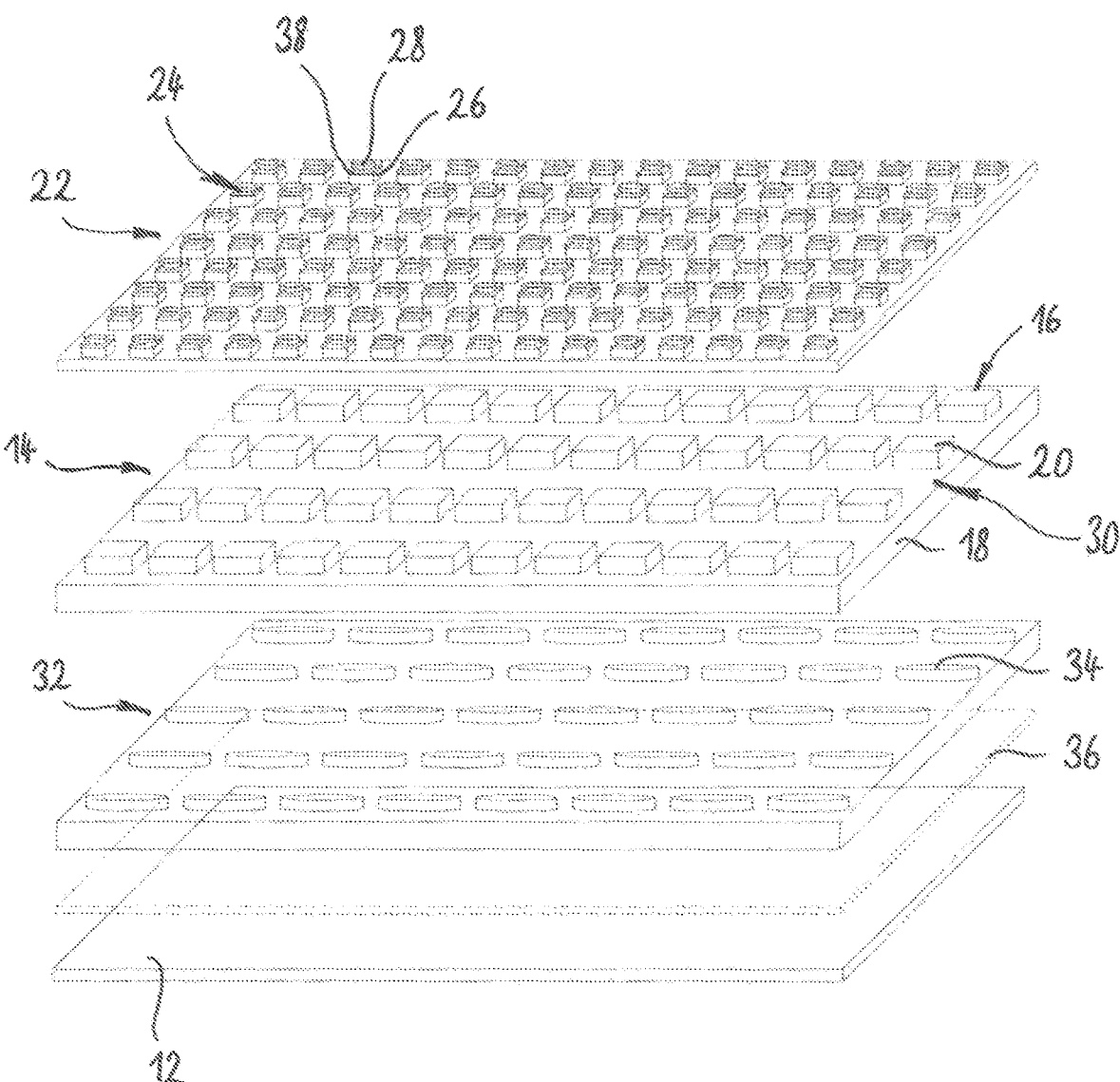
FIG. 2: is a schematic illustration of the structure of a second embodiment of a human-machine interface according to the invention.

FIG. 2 shows, schematically, a second exemplary embodiment of a human-machine interface 10, in which there is present an additional, second magnetic layer 32 having a total of forty electromagnets 34, which are arranged in the form of a 5×8 array. Instead of the electromagnets 34 used here, other magnetic or magnetizable elements may also be used (not shown). In the example shown in FIG. 2, the second magnetic layer 32 is located between the carrying element 12 and the layer 14, but the second magnetic layer could also be arranged between the layer 14 and the flexible, first magnetic layer 22.

In the exemplary embodiment shown, the second magnetic layer 32 serves to build up a magnetic field strength and polarity, during operation of the human-machine interface 10, such that a repulsion of the magnets 26 within the flexible, first magnetic layer 22 in the direction of the surface of the mentioned skin area is effected. In this manner, the skin conformity of the flexible layer 22 is increased even in the case of rapid deformations of the skin surface, and hysteresis phenomena caused by the resilience of the flexible layer 22 are additionally reduced. In addition, premature saturation of the magnetometers 16 can be counteracted in this way.

In order to avoid disturbances of the magnetic field strengths of the first magnetic layer 22 and of the second magnetic layer 32, a magnetically highly permeable layer 36 is provided in the embodiment shown in FIG. 2 between the carrying element 12 and the second magnetic layer 32 for shielding purposes. Furthermore, there is a further magnetically highly permeable layer 38 between each magnet 26 and the associated EMG electrode 28, in order to minimize the influence of disturbances between the EMG electrode 28 and the magnet 26 of a combined sensor element 24 within the first magnetic layer 22.

Method According to the Invention

Figure 3:
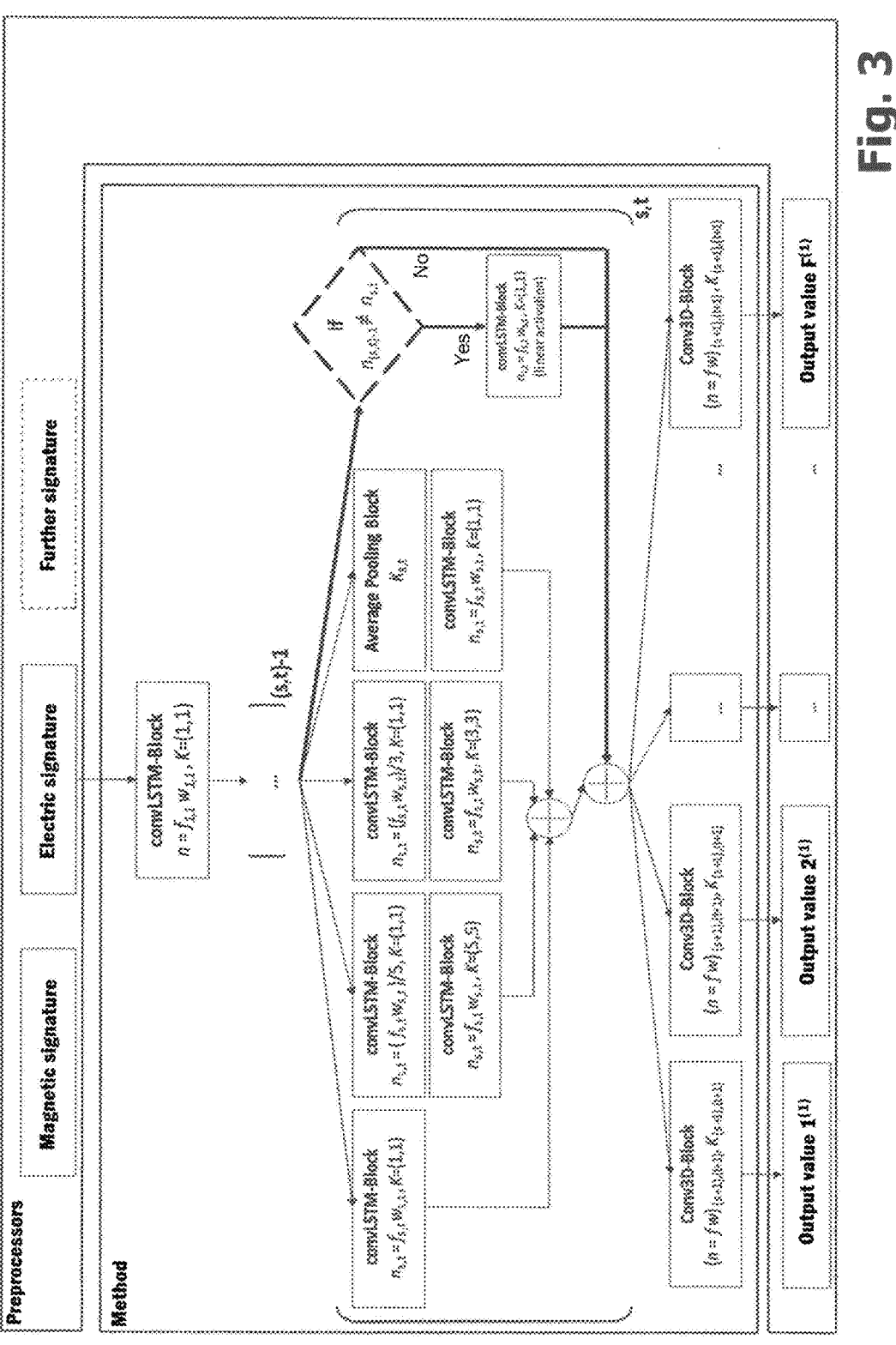
FIG. 3: is a block diagram of a method for recognizing continuous movements using the example of finger and hand movements.

In order to allow continuous finger and hand movements to be recognized with the aid of the described wearable human-machine interface 10, a method based on neural networks has been developed, see in particular FIG. 3. The method implements a monitored learning algorithm, which assigns magnetic, optionally electric, and optionally further signatures, for example of capacitive and optical sensor arrays, to measured output, that is to say target, values. The method, that is to say the neural network architecture, typically uses data from a domain-specific data conditioning. Although the described method is primarily directed, within the scope of the present disclosure, at allowing allocation to a configuration and/or movement and/or intensity thereof on the basis of detected magnetic signatures, optionally in combination with measured electric and further signatures, it should expressly be pointed out in this connection that such a method is suitable for the processing of any type of signatures and combinations thereof. Such a method can accordingly allow mapping to a configuration and/or movement and/or intensity thereof, for example, also based on capacitive signatures detected by means of one or more capacitive sensors, if desired also in combination with other electric signatures, for example electromyographic signatures, and optionally further signatures. Likewise, such a method can allow mapping to a configuration and/or movement and/or intensity thereof, for example, also based on optical signatures detected by means of one or more optical sensors, if desired again in combination with other signatures of electric and/or magnetic nature. Such alternative embodiments of the method described herein are likewise part of the present disclosure.

Since the data are measurements of temporal sequences with a spatial arrangement, additional statistical or physical calculation values can be constructed from the measurements and advantageously taken into account in the method as a supplementary filter channel: for example, the vector quantity can be calculated from the magnetometer measurements in the x-, y-, z-direction and concatenated as an image-equivalent channel. The same applies to the high-frequency electric signatures, which can continuously be evaluated by the definition of sliding windows (sliding window approach) with the aid of statistical parameters. In this sense, signals from magnetic and electric signature and also signals from different time steps can also be combined. Accordingly, not only can the performance of the prediction of the actual finger and hand movements be substantially increased, but additional physical information or statistical information for evaluating medical or user-specific questions can also be obtained.

The described method is not limited to finger and hand movements but generally allows the allocation of measured, combined signatures with physiologically associated movements or movement intensities as output values.

FIG. 3 shows that the method according to the invention bases the recognition of continuous movements on convolutional long short-term memory (convLSTM, i.e. LSTM with a convolutional kernel) and 3D convolutional (Conv3D) neural networks. Preprocessors carry out a domain-specific signal conditioning, for example artefact elimination in the case of electric signatures from EMG measurements, typically also normalization to the interval, here [0,1], and in particular rendering into the input format of image-equivalent matrices. The resulting signals from the preprocessor are in each case non-linearly projected with the aid of convLSTM blocks with 1×1 kernel and passed to the blocks in brackets. The method is of modular construction and scalable by the parameters s=1, 2, . . . , S (stage) and t=1, 2, . . . , T (depth). The parameter $n_{s,t}$ stands for the total number of filters n in stage s with depth t and with kernel size K. The parameter $f_{s,t}$ represents the filter base number which, in combination with the filter multiplier $w_{s,t}$, controls the width of the architecture. The whole architecture is thus flexibly adaptable to a large number of problem sizes with varying complexity due to a varying number of input values and output values to be predicted, since width and depth can be scaled. The path with the arrows emphasized in bold represents a skip connection.

The number and selection of the output values is application-specific. In the case of the prediction, for example, of individual gestures within the context of a classification problem, the only output value is a one-hot matrix, wherein the activation function of the conv3D block associated therewith is by default defined as softmax activation.

The domain-specific preprocessor delivers artefact-free input data, typically scaled or normalized to the interval [0,1] and rendered image-wise, topographically, that is to say arranged in a spatially meaningful manner, in the form of numerically processable matrices of dimension (sequence length, number of sensor elements in the x-direction, number of sensor elements in the y-direction, channel depth: totality of the dimension of a measured value and the dimension of constructed calculation values). Measured values with high statistical variation can be replaced or supplemented by sliding statistical calculation values of a sequence of measured values. This is particularly advantageous in the case of EMG measurements since, owing to their high sampling rate compared to magnetometer measurements, statistical calculation values can be elevated above the timeframe from the last to the next magnetometer measurement and the different sampling rates can thus expediently be synchronized.

Statistical calculation values for the evaluation of EMG signals are inter alia mean absolute value, mean absolute value slope, slope sign changes, waveform lengths, zero crossings, root mean square, waveform length, number of zero crossings, variance and maximum in the temporal domain and wavelet packet transformations in the frequency domain.

By way of explanation it is here assumed that the magnetometers measure the magnetic field in the x,y,z-direction and a measured value assumes the dimension three. Physical calculation values can hereby be constructed, for example the vector quantity, the unit vector, etc.

Electromyographic measurements usually have the dimension one, that is to say the potential change measured by one electrode. Accordingly, measured values of an array of magnetometers and the electromyographic measurements, after artefact removal, analog/digital conversion and filtering, can be rendered as image-equivalent matrices which, when arranged in a spatially meaningful manner, that is to say usually according to their position in the sensor array, represent a topographic image of the measured values corresponding to their respective domains. In the present embodiment of the method, these domain-specific sequences of image-equivalent matrices are concatenated along the channel depth. The channel depth accordingly increases with the number of domain-specific measured values and with the number of constructed calculation values. A sequence of a temporal sequence of these combined image-equivalent matrices can then be fed to the method. The blocks that occur in the architecture of the method are summarized in Table 1.

TABLE 1

| Construction of the blocks of the method with their implemented functionalities | | |
| --- | --- | --- |
| Blocks | | Description |
| convLSTM-Block | 1. Convolutional LSTM | Number of Filters $n_{s,\,t} = f_{s,\,t}\, w_{s,\,t}$ |
| | | Kernel Size $K_{s,\,t}$ |
| | | Stride $S_{s,\,t}$ |
| | | Padding padding = "same" |
| | | Return Sequences True |
| | | Dropout-Rate Kernel and Recurrent Kernel |
| | | L2-Regularisation Kernel, Bias, and Recurrent Kernel |
| | 2. Activation | Activation Function $A_{s,\,t}$ |
| | 3. Batch-Norm | True |
| Average Pooling Block | Average Pooling | Wrapper Time-distributed |
| | | Kernel Size $K_{s,\,t}$ |
| | | Stride $S_{s,\,t}$ |
| | | Padding padding = "same" |
| Add | Tensor-Addition | Sum over the outputs of all convLSTM-Blocks $O_{s,\,t}$ |
| Add | Tensor-Addition w/ Residual Scaling | Weighted sum of stage input I and stage output O $O_{s,\,t} = (I + R\,{}^{*}O)_{s,\,t}$ |
| Conv3D-Block | 1. 3D-Convolution | Number of Filters $(n = fw)_{s=(S+1),\ t=(T+1)}$ |
| | | Kernel Size $K_{s=(S+1),\ t=(T+1)}$ |
| | | Stride $S_{s=(S+1),\ t=(T+1)}$ |
| | | Padding padding = "same" |
| | | Dilation Rate $D_{s=(S+1),\ t=(T+1)}$ |
| | | L2-Regularisation Kernel and Bias |
| | | Activation None |
| | 2. Activation | Activation Function $A_{s=(S+1),\ t=(T+1)}$ |
| | 3. Batch-Norm | True |
| | 4. Flatten | True |
| | 5. Dense | Number of Units $O_{s=(S+1),\ t=(T+1)}$ |
| | | L2-Regularisation Kernel and Bias |
| | | Activation function Softmax (Multiclass) or linear (Regression) |

Notes

The parameterization of these blocks does not change, unless indicated otherwise. The remaining parameters $n_{s,\,t}$ (total number of filters of size K), $f_{s,\,t}$ (filter base number), $w_{s,\,t}$ (filter multiplier) in the respective stages s = 1, 2, ... , S with depth t = 1, 2, ... , T complete the parameterization and give the resulting network architecture according to FIG. 3.

The terminology and default implementations are determined according to KERAS (https://keras.io/ version v2.2.4 with tensorflow backend (https://www.tensorflow.org/) version v1.15.0.

The described method makes it possible to reliably predict both discrete classes in the context of a multiclass classification problem (for example gestures) and continuous output values in the context of a regression problem (for example joint angle progressions of the extremities) on the basis of the data measured by the human-machine interface. The solution space described by the classes is often limited in the case of a gesture identification to the number of gestures. However, in an unmonitored learning problem, such as, for example, the k-means cluster algorithm, these classes need not be predefined. On the one hand, it is possible to define a large number of discrete gestures in dependence on the use scenario (e.g. control of a smartwatch), that is to say extend the solution space, and to carry out the described method as a multiclass classification. On the other hand, it is possible to specify biomechanically expedient and smooth movements between the defined, discrete gestures, which represent desired end configurations, so that more complex applications (e.g. control of a prosthetic hand) can also be achieved.

In the following it is described how, with the aid of the method, an identification is made possible which goes beyond the recognition of discrete classes and is able to image the solution space of many temporally continuous output values (regression). Not only is a magnetic and electric signature recorded in each case, but entire sequences of these signatures are recorded and evaluated over a timeframe which can be defined as desired. Accordingly, in addition to the spatial domain, a time domain is added, whereby a very comprehensive and application-oriented evaluation of the measurements provided by the described human-machine interface is made possible.

Exemplary Application

Within the scope of the experimental testing of the novel human-machine interface, measurements of joint angles of the fingers of the right hand (measured by a commercially available dataglove) synchronized with the measurements of the human-machine interface and normalized were defined as output values. A regression problem was then formulated, that is to say a prediction of joint angles based on measurements of the human-machine interface, and solved with the aid of the method according to the invention illustrated in FIG. 3. The joint angles of the right hand can accordingly be predicted based on the measurements of the human-machine interface.

In order to generate the necessary data, the dataglove is placed on the right hand and the human-machine interface is placed on the right forearm so that the measured values of the dataglove and of the human-machine interface according to the invention can be recorded synchronously during fine, unrestricted finger movements. The human-machine interface according to the invention thereby measures the changes of the electric and magnetic signature which occur as a result of the skin deformations caused at the right forearm by the finger movements, or the myoelectric activity of the underlying muscles. The movements are performed as naturally as possible with varying intensity and with some variance in speed over a period of 10 minutes and correspondingly recorded.

It should be noted that the definition of the output values by the measured values of the dataglove is only an example. The output values can be defined in any way or even reduced to a classification problem, but they must expediently be able to be explained directly or indirectly by the sensor values measured by means of the wearable human-machine interface.

Experimental Setup

Figure 4:
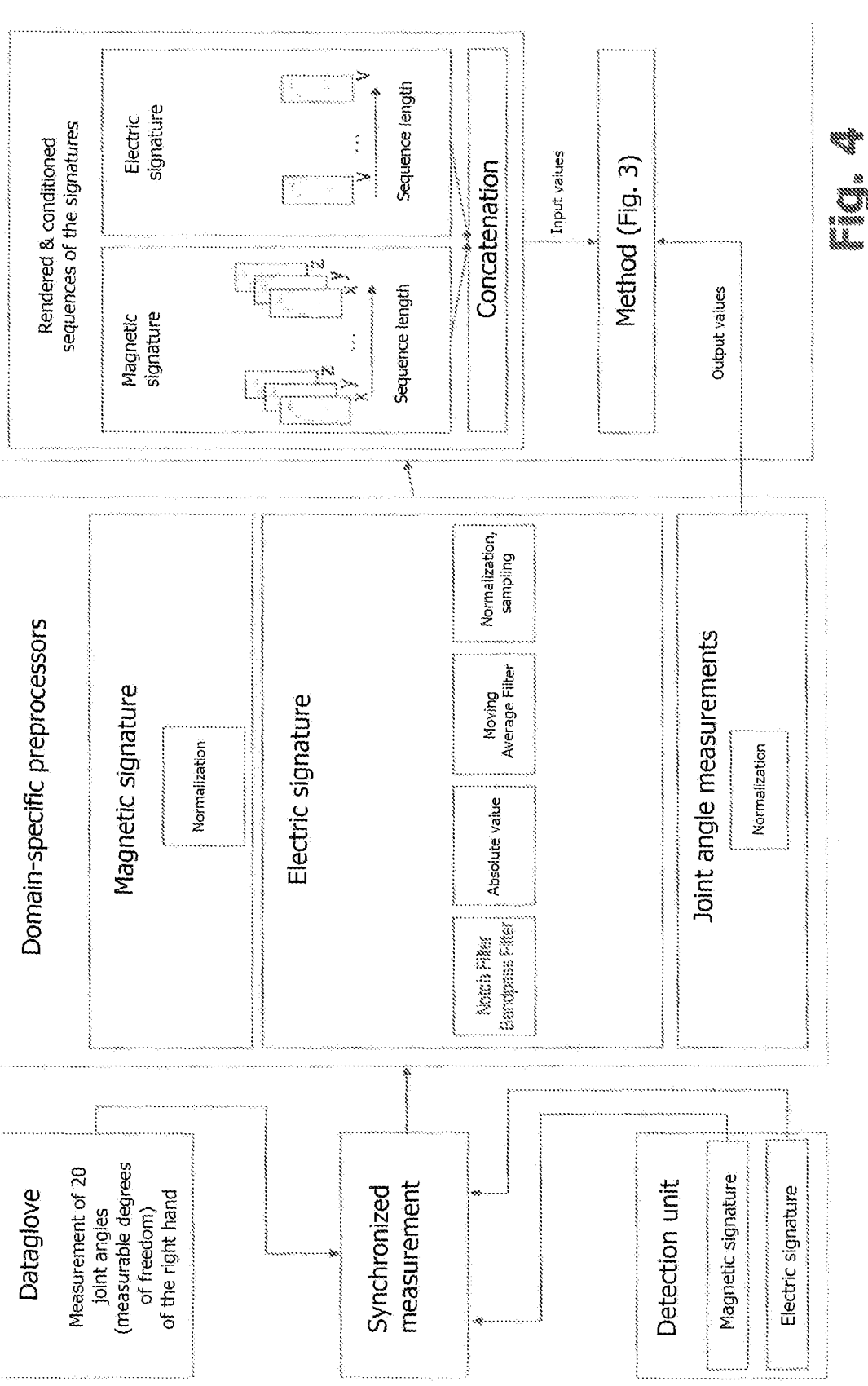
FIG. 4: is a flow diagram illustrating the experimental setup for evaluating the human-machine interface according to the invention using the method according to the invention.

The human-machine interface 10 used within the context of the experiment consisted of an array of 128 (8×16 array) combined sensor elements 24 with a spacing between the combined sensor elements of 7 mm. The schematic setup of the experiment and the domain-specific processing steps are shown in FIG. 4, in which there are shown schematically the dataglove and the synchronized measurement of the joint angles with the corresponding magnetic and electric signatures measured by the detection device. The synchronized measurements allow the hand-finger configuration defined by the totality of the joint angles and the temporal change thereof to be mapped to the magnetometer/electrode measurements with the aid of the method according to the invention.

The measured electric signatures were sampled via μg/AgCl electrodes with a frequency of 1000 Hz. A reference electrode was fastened to the elbow of a user. First of all, elimination of the mains line disturbance by a notch filter at 60 Hz with a Q factor of 50 was carried out. Then the electric signatures were Butterworth-bandpass-filtered (2nd order, cut-off frequencies: 20-390 Hz), the absolute value was formed, and the moving average was determined over a sliding window of length 10 ms in conformity with the sampling rate of the magnetometers. The conditioned elecwise normalized to the value range [0,1]. The sampling rate of the dataglove was 100 Hz.

Prediction of continuous movements by means of the method according to the invention and the human-machine interface according to the invention For determining the finger movements by means of the method according to the invention of FIG. 3 and Table 1, the following parameters were defined (Table 2). The mean squared error between the predicted values and the output values was defined as the cost function. The selected optimization method was ADAM (learning rate=0.0001; $\beta_1$=0.9; $\beta_2$=0.999; decay=0.0; e=none, amsgrad=false). The residual scaling (R, Table 1) was defined as R=1. As already mentioned, the terminology and default implementations are determined according to KERAS (https://keras.io/ version v2.2.4 with tensorflow backend (https://www.tensorflow.org/) version v1.15.0.

TABLE 2

Parameterization of the method for recognizing continuous finger movements from combined signatures.

| | Blocks | Description |
|---|---|---|
| Number of stages S = 1, depth T = 2, filter base number $f_{s, t}$ = f = 24, filter multiplier $w_{s, t}$ = w = 4 | | |
| convLSTM-Block | Convolutional LSTM | Stride ((1.1)), Dropout-Rates (0.2), L2-Regularisation-Rates (0.0035) |
| | Activation | Activation Function (tanh) |
| Average Pooling Block | Average Pooling | Kernel Size ((2.2)), Stride ((1.1)) |
| Conv3D-Block | 3D-Convolution | Kernel Size ((3, 3, 3)), Stride ((1, 1, 1)), Dilation Rate ((1, 1, 1)), L2-Regularisation-Rates (0.0035) |
| | Activation | Activation Function (ReLu) |
| | Dense | Number of Units (20), L2-Regularisation (0.0035), Activation-Function (Linear) | tric signatures were finally normalized to the value range [0,1]. Then the conditioned measured values of the electric signatures were rendered into an image-equivalent matrix in conformity with the arrangement of the combined sensor elements. The magnetic signatures were measured with a sampling rate of 100 Hz and, analogously to the electric signatures, normalized to the value range [0,1] and rendered into an image-equivalent matrix.

As a final step of the data conditioning (preprocessing), the temporal synchronization of the filtered and averaged electric signatures with the magnetic signatures was carried out via the detection device.

The description of continuous finger movements is advantageously achieved via the definition of joint angles, taking account of the meaningful degrees of freedom for describing the movement. These are temporally continuous, dynamic values and, as already discussed above, are determined by formulating and solving a regression problem from the pure magnetometer measurements and the conditioned measurements of the myoelectric activity, that is to say the conditioned electric signatures. The dataglove makes it possible to indirectly measure degrees of freedom distributed over the hand and the individual fingers, for the detailed description of the finger movements (see also FIG. 4). The measured sensor values can then be converted into the biomechanical joint angles of the human hand via a calibration. The synchronized joint angle measurements of the calibrated dataglove were accordingly used as output values and like- The instance of the method thus completely defined, that is to say the resulting neural network, was trained in the context of 150 epochs with a batch size of 64. Sequences (sequence length $s_L$=10) of the conditioned, combined signatures were thereby fed to the method as rendered image-equivalent matrices, wherein the concatenated filter channel had the depth four (resulting from the x-, y-, z-measurements of the magnetic signature and the conditioned measurements of the electric signature, see FIG. 4). In the context of the experimental testing, the resulting neural network was trained, or evaluated, with in each case 42,000 (training dataset), 12,000 sequences (test dataset) and 6000 (validation dataset) randomized sequences. The accuracy, or precision, of the prediction of the finger movements is naturally dependent on the synchronized measurement frequency of the dataglove and the wearable human-machine interface, so that, for quicker movements, higher measurement frequencies must also be maintained. In addition, a sufficiently long measurement window, which contains sufficient information (magnetometer and electric measurements and values constructed therefrom) for the prediction, must be chosen. The resulting, synchronized measurement frequency was $f_M$=100 Hz, which corresponded to the maximum sampling rate of the magnetometer measurements and of the dataglove. This comparatively high frequency also permitted very good results for quicker than average grasping movements.

In order to evaluate the performance of the system as a whole (human-machine interface according to the invention in combination with the method according to the invention), the root mean square error (RMSE) and the coefficient of determination (R2) between the actual joint angle progressions measured by the dataglove and the joint angle progressions predicted by the system as a whole for the 20 measured joint angle degrees of freedom for the cross-validation dataset were evaluated over a timeframe of 3 min. The root mean square error was on average 2.6%, the mean coefficient of determination was on average 97.5% for all gestures.

The described method, in conjunction with the wearable non-invasive human-machine interface, is accordingly a versatile real-time system which not only allows continuous finger and hand movements to be identified by means of algorithms of artificial intelligence, for example for the intuitive manipulation of digital systems, but additionally allows application-specific analyses, for example for medical further processing or diagnostics, by taking account of physical and statistical values constructed from the measured, or detected, magnetic and electric signatures (and optionally in addition the data obtained from acceleration and rotation rate sensors).

The invention claimed is:

1. A human-machine interface configured for non-invasive application to a skin area of an extremity of a human or animal body, comprising:
  a flexible layer configured to come into contact with a surface of the skin area and which includes or carries a plurality of magnetic or magnetizable elements, magnetic fields of which together form a magnetic signature at any point in time, wherein a flexibility of the flexible layer is such that the flexible layer follows deformations of the surface of the skin area, and wherein the magnetic signature changes in a measurable manner in response to deformation of the surface of the skin area,
  a detection device for measuring the magnetic signature based on the deformation of the flexible layer, which the detection device faces a side of the flexible layer that is remote from the skin area,
  a plurality of potential-measuring surface electrodes arranged in or on the flexible layer configured to come into direct contact with the surface of the skin area, wherein a totality of measurement signals generated at a specific point in time by the potential-measuring surface electrodes forms an electric signature which changes in dependence on muscle activity causing the deformation of the surface of the skin area, and
  an integrated or external processing unit configured to map the magnetic signature and the associated electric signature to at least one of a configuration of the extremity, a temporal change in the configuration and a force of the temporal change.

2. The human-machine interface according to claim 1, wherein the plurality of magnetic or magnetizable elements comprises a plurality of magnets arranged in the form of an array.

3. The human-machine interface according to claim 2, wherein the plurality of magnets and the plurality of potential-measuring surface electrodes contain the same number of magnets and potential-measuring surface electrodes, and wherein each of the number of potential-measuring surface electrodes is fixedly coupled with a respective one of the number of magnets.

4. The human-machine interface according to claim 1, wherein the detection device contains multiple magnetometers arranged in the form of an array.

5. The human-machine interface according to claim 1, wherein the plurality of potential-measuring surface electrodes comprises a plurality of electromyography (EMG) electrodes.

6. The human-machine interface according to claim 1, further comprising an electromagnetic insulating layer arranged between the plurality of potential-measuring surface electrodes and the plurality of magnetic or magnetizable elements or magnets.

7. The human-machine interface according to claim 1, further comprising an additional layer, having a further plurality of magnetic or magnetizable elements, arranged between the flexible layer and the detection device or on a side of the detection device remote from the flexible layer, wherein the further plurality of magnetic or magnetizable elements of the additional layer have a magnetic field strength or polarity during operation of the human-machine interface such that the flexible layer is preloaded in the direction of the skin area.

8. The human-machine interface according to claim 1, wherein the deformation of the surface of the skin area results from a deliberate or involuntary movement of at least one of a muscle, tendon, ligament, bone or organ.

9. The human-machine interface according to claim 1, wherein the human-machine interface further includes at least one of one or more acceleration sensors and one or more rotation rate sensors, output signals of which are fed to the processing unit.

10. The human-machine interface according to claim 1, wherein the processing unit is configured to map the magnetic signature and the associated electric signature to the at least one of the configuration of the extremity, the temporal change in the configuration and the force of the temporal change with the assistance of at least one of Bayes classifiers, an artificial neural network, a support vector machine, a finite state machine, a hidden Markov model, a relevance vector machine, a dynamic time warping method, a conditional random field method, a decision tree, a random forest method, a k-nearest neighbors algorithm, a discriminant analysis, a linear regression, a logistic regression, a Gaussian process, a perceptron and one or more of a Bayes optimal, classifier, bagging or boosting ensemble method.

11. The human-machine interface according to claim 1, further comprising a communication unit for exchanging data with at least one external device which, based on data exchanged with the human-machine interface, is configured to perform an action corresponding to the at least one of the configuration of the extremity, the temporal change in the configuration and the force of the temporal change.

12. A method for detecting a deformation of a surface of a skin area of an extremity of a human or animal body and mapping the detected deformation to at least one of a configuration of the extremity, a temporal change in the configuration and a force of the temporal change, the method comprising:
  arranging a plurality of magnetic or magnetizable elements on or close to the surface of the skin area, such that the plurality of magnetic or magnetizable elements is able to follow a deformation of the surface of the skin area,
  arranging a plurality of potential-measuring surface electrodes such that the potential-measuring surface electrodes come into direct contact with the surface of the skin area, determining at least one measurable change, occurring as a result of a deformation of the surface of the skin area, of a magnetic signature formed by magnetic fields of a totality of the plurality of magnetic or magnetizable elements by a detection device for measuring the magnetic signature, recording measurement signals generated at a specific point in time by a totality of the plurality of potential-measuring surface electrodes in order to obtain at least one electric signature that changes in dependence on muscle activity causing deformation of the surface of the skin area, and executing an algorithm for mapping the determined at least one measurable change of the magnetic signature and the obtained at least one electric signature to the at least one of a configuration of the extremity, the temporal change in the configuration and the force of the temporal change.

13. The method according to claim 12, wherein the algorithm is a trained artificial intelligence which has determined or learned a relationship between the magnetic signature and the at least one electric signature and associated at least one of the configuration of the extremity, the temporal change in the configuration and the force of the temporal change based on a dataset consisting of at least one of the magnetic signature and the at least one electric signature and an associated at least one of the configuration of the extremity, the temporal change in the configuration and the force of the temporal change.

14. The method according to claim 12, wherein the magnetic signature and the at least one electric signature are mapped to the at least one of the configuration of the extremity, the temporal change of the configuration and the force of the temporal change with the assistance of at least one of Bayes classifiers, an artificial neural network, a support vector machine, a finite state machine, a hidden Markov model, a relevance vector machine, a dynamic time warping method, a conditional random field method, a decision tree, a random forest method, a k-nearest neighbors algorithm, a discriminant analysis, a linear regression, a logistic regression, a Gaussian process, a perceptron and one or more of a Bayes optimal, classifier, bagging or boosting ensemble method.

15. The method according to claim 12, wherein the magnetic signature to be measured is detected by multiple magnetometers arranged in the form of an array.

16. The method according to claim 15, wherein, when measuring the magnetic signature, at least one of magnetic field strengths and magnetic flux densities is measured in at least one of an x-, y-and z-direction.

17. The method according to claim 12, wherein the deformation of the surface of the skin area results from a deliberate or involuntary movement of at least one of a muscle, tendon, ligament, bone or organ.

18. The method according to claim 12, further comprising determining at least one of accelerations and rotation rates in addition to determining magnetic signatures.

19. The method according to claim 12, further comprising:

assigning a control command to an associated at least one of the configuration of the extremity, the temporal change of the configuration and the force of the temporal change, and transmitting the control command to a device.

* * * * *